United States Patent [19]

Newman

[11] 3,818,965
[45] June 25, 1974

[54] PNEUMATIC TIRE
[75] Inventor: James F. Newman, St. Clair Shores, Mich.
[73] Assignee: Uniroyal Inc., New York, N.Y.
[22] Filed: Apr. 24, 1972
[21] Appl. No.: 247,112

[52] U.S. Cl............................................. 152/209 R
[51] Int. Cl. ........................................... B60c 11/07
[58] Field of Search .................................... 152/209

[56] References Cited
UNITED STATES PATENTS
3,698,462  10/1972  Jacobs ............................. 152/209

Primary Examiner—James B. Marbert
Attorney, Agent, or Firm—Charles A. Blank, Esq.

[57] ABSTRACT

A pneumatic tire having slots within the sub-tread for cooling purposes. The slots are generally placed in the shoulder regions of the tire, since these regions are materially thick and consequently retain more heat during tire operation. The slots divide the thick heat absorbing rubber regions into smaller regions of lesser heat absorption. Also, the walls of the slots provide a greater surface area to blend-off excess heat from the base of the tread.

4 Claims, 4 Drawing Figures

PATENTED JUN 25 1974  3,818,965

PNEUMATIC TIRE

This invention relates to pneumatic tires and more particularly to pneumatic tires having a novel design.

BACKGROUND OF THE INVENTION

New quality requirements for passenger mud and snow tires and regular highway tires are being put into effect by the Department of Transportation. One of the recent requirements is that mud and snow tires have the same durability as regular highway tires, as expressed in stepped-up-speed and stepped-up-load type testing.

Because snow tires have a thicker tread, especially in the shoulder areas, they generally run hotter. This reduces their useful life in a number of ways.

It is a primary object of this invention, therefore, to design or otherwise modify a tire to run cooler so as to extend its durability.

PRIOR ART

Heretofore many attempts have been made to design a cooler runnning tire. Many designs vent heat through holes located under the sub-tread of the tire, such as may be seen in the patents to: Frederick A. Krusemark, Pat. No. Re 18,618, reissued: Oct. 1, 1932; and Harry P. Schrank, Pat. No. 1,877,988, issued: Sept. 20, 1932.

Other designs depict holes, vanes, or grooves in or on the buttress of the tire, such as may be seen in the patents to: Charles Neimeyer et al., Pat. No. 1,833,225, issued: Nov. 24, 1932; Paul E. Hankinson, Pat. No. 2,303,164, issued: Nov. 24, 1942; William S. Bobin, Pat. No. 2,404,579, issued: July 23, 1946; Milton F. Pennock, Pat. No. 2,745,459, issued: May 15, 1956; and Hubert Reifenberger, Pat. No. 2,760,541, issued: Aug. 28, 1956.

Most of these designs deal with molded round and square holes. Many of these designs cannot be conveniently molded on present equipment, and are merely experimental concepts.

None of the above patents suggest or show the present inventive device of placing cooling slots in the sub-tread of the tire.

The nearest design to that of the invention features a sub-tread which is itself a cooling material. This tire dissipates heat by conduction rather than venting it as in the present invention.

SUMMARY OF THE INVENTION

The invention features slots in the sub-tread of a mud and snow tire. The slots are placed in the shoulder regions of the tire, because these regions are usually thickly constructed, absorbing and retaining a large quantity of heat.

The slots are introduced into the sub-tread by means of inserts placed in the mold. When the tire is molded these inserted members provide slots in the subtread. Heat dissipation is accomplished in several ways:

a. The slots divide the huge bulk of the tire shoulder material into smaller incremental sections. This incrementalization of the shoulder material disrupts the pattern of the heat flow, and consequently there is less heat build-up;

b. The slots introduce a greater heat dissipating or discharging surface from which heat is lost through convectional and radiational effects; and c. The slots receive the air stream as the air rushes over the rotating tire, thus capturing cooling air for the hot tire sub-tread.

It is an object of the present invention to provide a pneumatic tire that runs cooler than other such tires.

It is another object of the invention to provide slots in the sub-tread of a tire resulting in a cooler running tire.

It is but another object of the invention to provide a pneumatic tire having more wheel hours (durability) than other such tires.

These and other objects of this invention will be better understood and become more apparent with reference to the following detailed description and accompanying drawings, in which.

Generally speaking, the invention concerns the tread portion of a pneumatic tire for vehicles. The tread is annularly disposed on the crown portion of the tire carcass. The base of the grooves of the tread, commonly referred to as the sub-tread, contains a plurality of elongated depressions. The depressions vent, bleed, or otherwise dissipate heat from the sub-tread, which is generated during the operation of the tire.

Figure 1:
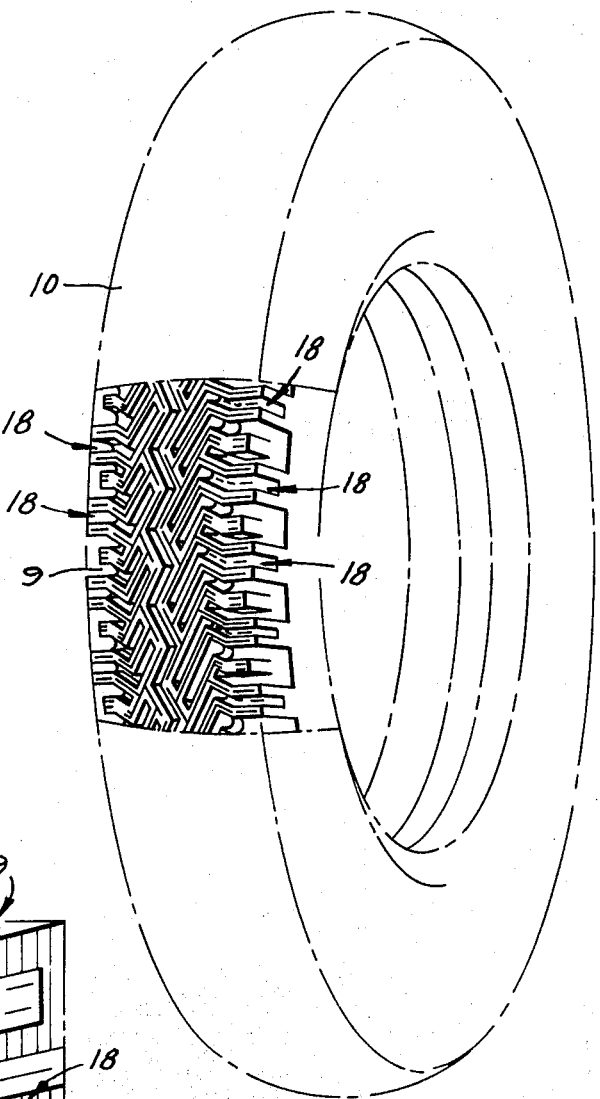
FIG. 1 is a perspective in situ view of part of the tread portion of a pneumatic tire in accordance with the invention.

Now referring to FIG. 1, a tire 10 is shown having a tread 9 that circumscribes the crown portion thereof. For the sake of brevity, only a fragmentary or sectional portion of tread 9 is shown, since the tread pattern is repetitive.

Figure 3:
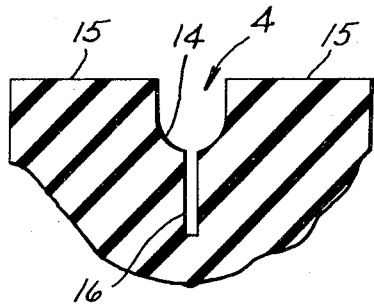
FIG. 3 is a cross-sectional view of the tread of FIG. 2 taken along line 3—3.
Figure 2:
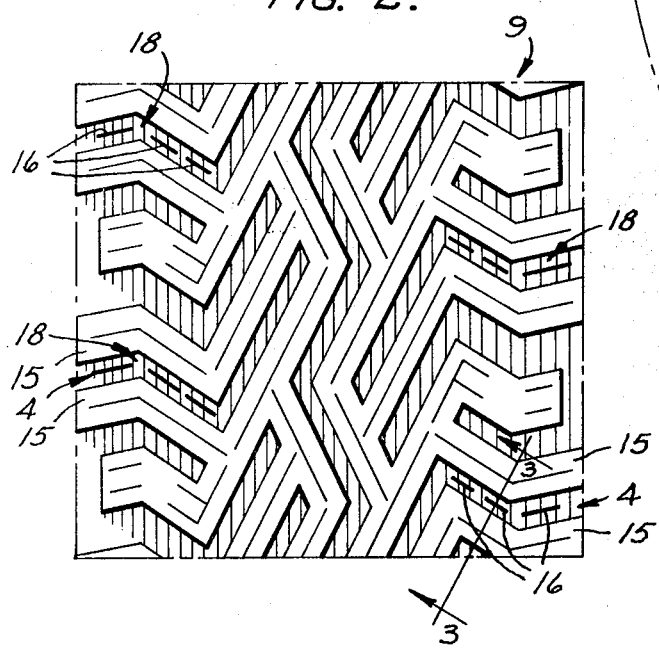
FIG. 2 is a plan view of the tread portion of FIG. 1.

FIG. 2 shows a plan view of the tread portion 9. The tread 9 contains a plurality of slots or elongated depressions 16 disposed periodically along the shoulder of the tread as shown by arrows 18. Three slots 16 are shown, but the number and shape of slots may vary with tread design. Each tread region 18 is respectively characterized by primary (road engaging) surfaces 15 having grooves 4 (as shown by the arrow) running therebetween (FIGS. 2 and 3). The bottom 14 (sub-tread) of the groove 4 has slots 16 disposed therein (FIGS. 2 and 3).

Figure 4:
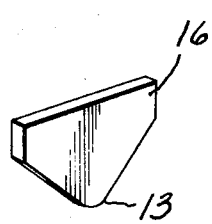
FIG. 4 is a perspective view of an internal slot configuration of this invention.

FIG. 4 depicts the internal slot configuration. The slot 16 is tapered to a point 13 in the bottom thereof.

The slots 16 are disposed in the middle of the bottom 14 of the grooves 4. The slots divide the heat absorbing regions 18 into smaller heat regions, thus reducing heat build-up. The slots 16 also bleed-off excess heat by venting and by capturing cooling air as the tire rotates.

The tread 9 shown in FIGS. 1 and 2 is for a mud and snow tire, but the above invention can be used on regular highway tires with similar results.

Cooling slots 16 are put into the sub-tread by placing inserts into the tire mold. This is a very simple modification to the mold, and is therefore, easily adaptable to mass-production.

Tests reveal that an average temperature reduction of 33° is obtainable with sub-treads designed in accordance with this invention.

Many modifications will naturally occur to those skilled in the art. These changes are deemed to fall within the scope and spirit of this invention as presented by the appended claims.

We claim:

1. A pneumatic tire of the mud and snow type comprising a carcass and an annular tread disposed on a circumference of a crown portion of said carcass and having shoulder regions, the tread having a primary tread portion defined as the road engaging surface of said tire having a plurality of grooves disposed therein transverse to said circumference of said crown portion, and a sub-tread portion laying below said primary tread portion and defined as the base of said grooves, said sub-tread portion having in the shoulder regions only of the tire a plurality of elongated depressions disposed therein for venting said sub-tread portion to dissipate heat from said sub-tread portion generated during the operation of the tire, said elongated depressions being disposed more closely to a direction perpendicular to the circumference of the tire than said depressions are disposed to the direction of the circumference of the tire.

2. The pneumatic tire of claim 1, wherein said elongated depressions longitudinally extend along the sub-tread portion in a middle portion thereof to provide uniform heat dissipation within said sub-tread.

3. The pneumatic tire of claim 1, wherein said elongated depressions are tapered in a bottom section thereof.

4. The pneumatic tire of claim 1, wherein said elongated depressions are disposed within the middle of the tread groove and are tapered to a point in a bottom section thereof.

* * * * *